United States Patent
Zhu et al.

(10) Patent No.: US 12,306,376 B2
(45) Date of Patent: May 20, 2025

(54) ANTI-REFLECTIVE STACK AND METHOD OF MANUFACTURING THE SAME, DISPLAY PANEL, AND DISPLAY DEVICE

(71) Applicants: HEFEI XINSHENG OPTOELECTRONICS TECHNOLOGY CO., LTD., Hefei (CN); BOE TECHNOLOGY GROUP CO., LTD., Beijing (CN)

(72) Inventors: Feifei Zhu, Beijing (CN); Xinxia Zhang, Beijing (CN); Ran Zhang, Beijing (CN); Wenbin Jia, Beijing (CN); Chengyong Zhan, Beijing (CN); Wenhao Tang, Beijing (CN)

(73) Assignees: HEFEI XINSHENG OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/246,329

(22) PCT Filed: May 7, 2022

(86) PCT No.: PCT/CN2022/091418
§ 371 (c)(1),
(2) Date: Mar. 22, 2023

(87) PCT Pub. No.: WO2023/216021
PCT Pub. Date: Nov. 16, 2023

(65) Prior Publication Data
US 2024/0319409 A1  Sep. 26, 2024

(51) Int. Cl.
*G02B 1/11* (2015.01)
*G02F 1/1335* (2006.01)

(52) U.S. Cl.
CPC .......... *G02B 1/11* (2013.01); *G02F 1/133514* (2013.01)

(58) Field of Classification Search
None
See application file for complete search history.

(56) References Cited

U.S. PATENT DOCUMENTS

| 6,646,702 B1 | 11/2003 | Motomura et al. |
| 6,803,973 B2 | 10/2004 | Ogino et al. |
| (Continued) | | |

FOREIGN PATENT DOCUMENTS

| CN | 1328269 A | 12/2001 |
| CN | 1979222 A | 6/2007 |
| (Continued) | | |

OTHER PUBLICATIONS

International Search Report and Written Opinion dated Jan. 18, 2023, for corresponding PCT Application No. PCT/CN2022/091418.

*Primary Examiner* — Shan Liu
(74) *Attorney, Agent, or Firm* — Kinney & Lange, P, A.

(57) ABSTRACT

An anti-reflective stack and a method of manufacturing the same, a display panel, and a display device. The anti-reflective stack includes: a substrate having a first refractive index and a first surface; an antistatic layer on a side of the substrate, the antistatic layer having a second refractive index and a second surface opposite to the first surface; and an anti-reflective layer between the substrate and the antistatic layer, the anti-reflective layer including at least one composite layer which includes a first anti-reflective layer having a third refractive index and a second anti-reflective layer having a fourth refractive index, where at most one first anti-reflective layer is attached with the first surface, and at most one second anti-reflective layer is attached with the second surface, and each of the second refractive index (Continued)

and the third refractive index is greater than the first refractive index and the fourth refractive index.

18 Claims, 4 Drawing Sheets

(56) References Cited

U.S. PATENT DOCUMENTS

| | | | |
|---|---|---|---|
| 10,976,586 B2 | 4/2021 | Ai et al. | |
| 11,687,203 B2 | 6/2023 | Li et al. | |
| 2002/0068156 A1* | 6/2002 | Suzuki | C03C 17/42 |
| | | | 428/336 |
| 2002/0071075 A1 | 6/2002 | Ogino et al. | |
| 2010/0171908 A1* | 7/2010 | Yoshihara | G02B 1/111 |
| | | | 359/488.01 |
| 2010/0208350 A1* | 8/2010 | Yoshihara | G02B 1/16 |
| | | | 359/585 |
| 2014/0152943 A1* | 6/2014 | Dorjgotov | G02F 1/133502 |
| | | | 313/111 |
| 2020/0249519 A1 | 8/2020 | Ai et al. | |
| 2022/0382414 A1 | 12/2022 | Li et al. | |
| 2023/0111716 A1* | 4/2023 | Zhao | G02B 1/111 |

FOREIGN PATENT DOCUMENTS

| | | |
|---|---|---|
| CN | 102798913 A | 11/2012 |
| CN | 206312105 U | 7/2017 |
| CN | 109696759 A | 4/2019 |
| CN | 113311961 A | 8/2021 |
| JP | 2005288712 A | 10/2005 |
| JP | 2008083212 A | 4/2008 |

\* cited by examiner

ANTI-REFLECTIVE STACK AND METHOD OF MANUFACTURING THE SAME, DISPLAY PANEL, AND DISPLAY DEVICE

CROSS-REFERENCE TO RELATED APPLICATION(S)

This application is a Section 371 National Stage Application of International Application No. PCT/CN2022/091418, filed on May 7, 2022, entitled "ANTI-REFLECTIVE STACK AND METHOD OF MANUFACTURING THE SAME, DISPLAY PANEL, AND DISPLAY DEVICE".

TECHNICAL FIELD

The present disclosure relates to a field of display technology, and in particular, to an anti-reflective stack, a method of manufacturing the anti-reflective stack, a display panel, and a display device.

BACKGROUND

With a development of display technology, a display device may be applied into various aspects of life, such as an automobile, a laptop, a mobile phone and other products. Different display devices have different requirements for different environments. For example, for a display device that needs to be used outdoors, such as a vehicle mounted display device, the display device needs to have good readability in a well-lit outdoor environment. The anti-reflective performance of the panel of the display in the related art is poor, which may not meet the anti-reflective performance of outdoor light. In addition, other anti-reflective stacks have high manufacturing costs and long manufacturing period, which may not effectively improve the production efficiency of products.

It should be noted that the above information disclosed in this section is only used to strengthen the understanding of the background of the present disclosure, and therefore, the above information may contain information that does not constitute the related art known to those skilled in the art.

SUMMARY

In an aspect, an anti-reflective stack is provided, including: a substrate having a first refractive index and a first surface; an antistatic layer on a side of the substrate, where the antistatic layer has a second refractive index and a second surface opposite to the first surface; and an anti-reflective layer between the substrate and the antistatic layer, where the anti-reflective layer includes at least one composite layer, the composite layer includes a first anti-reflective layer and a second anti-reflective layer, the first anti-reflective layer has a third refractive index, and the second anti-reflective layer has a fourth refractive index, where at most one first anti-reflective layer is attached with the first surface of the substrate, and at most one second anti-reflective layer is attached with the second surface of the antistatic layer, and where the second refractive index is greater than the first refractive index and the fourth refractive index, and the third refractive index is greater than the first refractive index and the fourth refractive index.

In some exemplary embodiments of the present disclosure, a thickness of the first anti-reflective layer is less than or equal to a thickness of the second anti-reflective layer.

In some exemplary embodiments of the present disclosure, a material for manufacturing the antistatic layer includes at least one selected from a transparent metal oxide material, a solution-type conductive polymer material, or a sputter-type inorganic material.

In some exemplary embodiments of the present disclosure, the anti-reflective layer includes a plurality of composite layers, and a thickness of one of the plurality of composite layers close to the substrate is less than or equal to a thickness of another one of the plurality of composite layers close to the antistatic layer.

In some exemplary embodiments of the present disclosure, the anti-reflective layer includes a first composite layer close to the substrate and a second composite layer close to the antistatic layer, where the first anti-reflective layer of the first composite layer is attached with the first surface of the substrate, and the second anti-reflective layer of the second composite layer is attached with the second surface.

In some exemplary embodiments of the present disclosure, the anti-reflective layer includes a first composite layer close to the substrate, a third composite layer close to the antistatic layer, and a second composite layer between the first composite layer and the third composite layer, where a thickness of the first composite layer is less than or equal to a thickness of the second composite layer, and the thickness of the second composite layer is less than or equal to a thickness of the third composite layer.

In some exemplary embodiments of the present disclosure, the first refractive index is in a range of 1.45 to 1.55; the second refractive index is in a range of 1.50 to 1.90; the third refractive index is in a range of 1.80 to 2.30; and the fourth refractive index is in a range of 1.44 to 1.52.

In some exemplary embodiments of the present disclosure, a material for manufacturing the first anti-reflective layer is different from a material for manufacturing the second anti-reflective layer.

In some exemplary embodiments of the present disclosure, the material for manufacturing the first anti-reflective layer includes $SiN_x$; and the material for manufacturing the second anti-reflective layer includes $SiO_2$.

In some exemplary embodiments of the present disclosure, the anti-reflective stack further includes a polarizing layer on a side of the antistatic layer away from the substrate.

In some exemplary embodiments of the present disclosure, the polarizing layer has a fifth refractive index, and the fifth refractive index is less than the second refractive index.

In some exemplary embodiments of the present disclosure, the fifth refractive index is in a range of 1.45 to 1.55.

In some exemplary embodiments of the present disclosure, a thickness of the first anti-reflective layer is in a range of 5 nm to 65 nm; and a thickness of the second anti-reflective layer is in a range of 40 nm to 80 nm.

In some exemplary embodiments of the present disclosure, a thickness of the antistatic layer is in a range of 14 nm to 30 nm.

In some exemplary embodiments of the present disclosure, the transparent metal oxide material includes indium tin oxide; the solution-type conductive polymer material includes Heraeus-polyethylene dioxythiophene; and the sputter-type inorganic material includes a mixture of graphite oxide, tin oxide, zinc oxide, aluminum oxide, antimony oxide, and surfactant, crosslinking agent.

In some exemplary embodiments of the present disclosure, the substrate includes a color filter.

Another aspect of the present disclosure provides a method of manufacturing an anti-reflective stack, including: forming a substrate having a first refractive index and a first surface; forming an antistatic layer on a side of the substrate, where the antistatic layer has a second refractive index and a second surface opposite to the first surface; forming an anti-reflective layer on a side of the substrate, where the anti-reflective layer includes at least one composite layer, the composite layer includes a first anti-reflective layer and a second anti-reflective layer, the first anti-reflective layer has a third refractive index, and the second anti-reflective layer has a fourth refractive index; and forming an antistatic layer on a side of the anti-reflective layer away from the substrate, where the antistatic layer has a second refractive index and a second surface opposite to the first surface, where at most one first anti-reflective layer is attached with the first surface of the substrate, and at most one second anti-reflective layer is attached with the second surface of the antistatic layer, and where the second refractive index is greater than the first refractive index and the fourth refractive index, and the third refractive index is greater than the first refractive index and the fourth refractive index.

Another aspect of the present disclosure provides a display panel, including: an array substrate; a color film substrate, where the color film substrate is arranged opposite to the array substrate; a liquid crystal layer between the array substrate and the color film substrate; and an anti-reflective stack on a side of the color film substrate away from the array substrate, where the anti-reflective stack is the anti-reflective stack described above.

In some exemplary embodiments of the present disclosure, the color film substrate includes a base substrate, and the substrate of the anti-reflective stack includes the base substrate of the color film substrate.

Another aspect of the present disclosure provides a display device, including the display panel described above.

BRIEF DESCRIPTION OF THE DRAWINGS

In order to more clearly illustrate technical solutions in the present disclosure, accompanying drawings required to be used in some embodiments of the present disclosure will be briefly described below. It is apparent that the drawings in the following description are only drawings of some embodiments of the present disclosure, and other drawings may be obtained by those skilled in the art according to these drawings. Furthermore, the drawings in the following description may be regarded as schematic diagrams, and do not limit the actual size of products, the actual flow of methods, the actual timing of signals, and the like, involved in embodiments of the present disclosure, and in the drawings.

Figure 1:
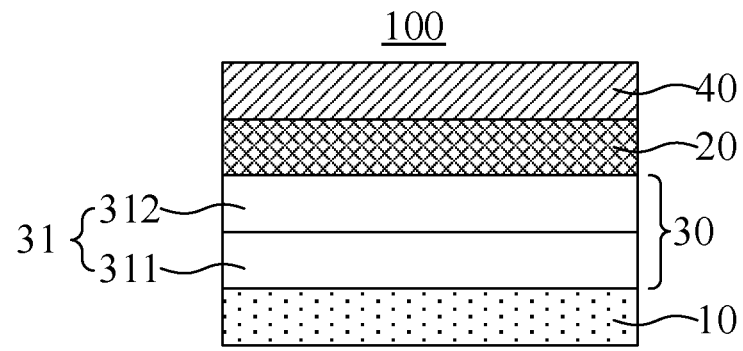
FIG. 1 shows a sectional structure diagram of an anti-reflective stack according to an exemplary embodiment of the present disclosure.

It should be noted that, for the sake of clarity, dimensions of layers, structures or regions in the accompanying drawings used to describe embodiments of the present disclosure may be enlarged or reduced, i.e., the accompanying drawings are not drawn to an actual scale.

DETAILED DESCRIPTION OF EMBODIMENTS

Technical solutions in some embodiments of the present disclosure will be described clearly and completely with reference to the accompanying drawings. It is obvious that the embodiments described are only some embodiments of the present disclosure, rather than all embodiments. All other embodiments, which may be derived by those of ordinary skill in the art from embodiments in the present disclosure, fall within the scope of protection of the present disclosure.

Unless the context otherwise requires, throughout the specification and the claims, a term "comprise" and its other forms, such as singular form in third personal "comprises" and present participle form "comprising", will be interpreted as open, inclusive meaning, that is, "including, but not limited to". In the description of the specification, terms "one embodiment", "some embodiments". "exemplary embodiments", "example", "specific example" or "some examples" and the like are intended to indicate that a particular feature, structure, material, or characteristic related to the embodiment or example is included in at least one embodiment or example of the present disclosure. The schematic representations of the above-mentioned terms are not necessarily referring to the same embodiment or example. Furthermore, the particular feature, structure, material, or characteristic may be included in any suitable manner in any one or more embodiments or examples.

In the following, terms "first" and "second" are only used for descriptive purposes and are not to be construed as indicating or implying relative importance or implicitly indicating the number of technical features indicated. Therefore, a feature defined with "first" or "second" may, explicitly or implicitly, include one or more of the feature. In the description of embodiments of the present disclosure, unless otherwise stated, "a plurality of" means two or more.

When describing some embodiments, an expression of "connection" and its derivation may be used. For example, a term "electrical connection" may be used when describing some embodiments to indicate that two or more components have direct physical or electrical contact with each other.

"At least one selected from A, B, and C" has the same meaning as "at least one selected from A, B, or C", and both include following combinations of A, B or C: only A, only B, only C, a combination of A and B, a combination of A and C, a combination of B and C, and a combination of A, B and C.

"A and/or B" includes following three combinations: only A, only B, and a combination of A and B.

A use of "configured to" herein means an open and inclusive language, which does not exclude devices that are applicable to or configured to perform additional tasks or steps.

In addition, a use of "based on" means openness and inclusiveness in that a process, step, calculation or other actions "based on" one or more of the conditions or values may be based on additional conditions or exceed the values in practice.

As used herein, "about" or "approximately" includes a stated value and an average value within an acceptable deviation range of a specific value, where the acceptable deviation range is determined by those of ordinary skill in the art taking into account a measurement being discussed and an error (i.e., a limitation of a measurement system) related to a measurement of a specific amount.

As used herein, "parallel", "vertical" and "equal" include a described situation and a situation similar to the described situation, and the range of the similar situation is within the acceptable deviation range, where the acceptable deviation range is determined by those of ordinary skill in the art taking into account a measurement being discussed and an error (i.e., a limitation of a measurement system) related to a measurement of a specific amount. For example, "parallel" includes absolutely parallel and approximately parallel, where the acceptable deviation range of approximately parallel may be, for example, within 5°. "Vertical" includes absolutely vertical and approximately vertical, where the acceptable deviation range of approximately vertical may also be, for example, within 5°. "Equal" includes absolutely equal and approximately equal, where the acceptable deviation range of approximately equal may be that, for example, a difference between the two which are equal is less than or equal to 5% of either.

It should be understood that when a layer or element is described as being on another layer or substrate, the layer or element may be directly on another layer or substrate, or an intervening layer may be between the layer or element and another layer or substrate.

Herein, "a same layer" refers to a layer structure formed by forming a film layer for forming a specific pattern by using the same film formation process and then using a mask through the one-shot patterning process. Depending on the specific pattern, the one-shot patterning process may include a plurality of exposure, development or etching processes, and the specific pattern in the formed layer structure may be continuous or discontinuous. The specific pattern may also be at different heights or have different thicknesses. On the contrary, "different layers" refers to the layer structures formed by forming film layers for forming specific patterns by using the corresponding film formation processes, and then using the corresponding masks through the patterning process. For example, "two layer structures are arranged in different layers" refers to that two layer structures are formed respectively under the corresponding process steps (film formation process and patterning process).

Exemplary embodiments are described herein with reference to sectional views and/or plan views as idealized exemplary drawings. In the accompanying drawing, the thickness of layers and regions is enlarged for clarity. Therefore, variations from the shapes of the drawings as a result, for example, of manufacturing techniques and/or tolerances, are to be expected. Therefore, exemplary embodiments should not be interpreted as being limited to the shape of the regions shown herein, but should include the shape deviation caused by, for example, manufacturing. For example, an etched region shown as a rectangle will generally have a curved feature. Therefore, the regions shown in the drawings are schematic in nature, and shapes of the regions are not intended to show the actual shapes of the regions of the device, and are not intended to limit the scope of the exemplary embodiments.

In embodiments of the present disclosure, a term "opposite to" means facing each other, for example, a first surface is opposite to a second surface may mean, for example, that the first surface and the second surface face to face.

A term "antistatic layer" refers to a film layer used to resist electrostatic discharge, that is, a film layer used to resist ESD (Electro-static discharge). For example, a film layer may be formed by coating an indium tin oxide material, or may be a high resistance film formed by coating a graphene material and the like.

In the related art, due to different refractive indexes between different film layers of different display devices, natural light has a higher reflectivity when passing through different film layers. When the reflectivity of natural light is higher, and the intensity of the reflected natural light is greater than the brightness of the display device, a user will not be able to see the content displayed on the display device, which affects the readability of the display device. In addition, in order to obtain a better anti-reflective effect, a material used in the anti-reflective stack in the related art is, for example, $Nb_2O_5$. The use of the material makes an impedance of a touch screen product relatively low, which may not meet the requirements of touch performance. Moreover, the manufacturing cost of the material is high, and the manufacturing period is long, resulting in low production efficiency.

In order to solve the above-mentioned problems, embodiments of the present disclosure provide an anti-reflective stack, including: a substrate having a first refractive index and a first surface; an antistatic layer on a side of the substrate, where the antistatic layer has a second refractive index and a second surface opposite to the first surface; and an anti-reflective layer between the substrate and the antistatic layer, where the anti-reflective layer includes at least one composite layer, the composite layer includes a first anti-reflective layer and a second anti-reflective layer, the first anti-reflective layer has a third refractive index, and the second anti-reflective layer has a fourth refractive index, where at most one first anti-reflective layer is attached with the first surface of the substrate, and at most one second anti-reflective layer is attached with the second surface of the antistatic layer, and where the second refractive index is greater than the first refractive index and the fourth refractive index, and the third refractive index is greater than the first refractive index and the fourth refractive index.

According to embodiments of the present disclosure, by providing the first anti-reflective layer and the second anti-reflective layer of the stack, and causing the second refractive index of the antistatic layer to be greater than the third refractive index, and to be greater than the first refractive index of the substrate and the fourth refractive index of the second anti-reflective layer, and causing the third refractive index of the first anti-reflective layer to be greater than the first refractive index of the substrate and the fourth refractive index of the second anti-reflective layer, the purpose of combining the material with high refractive index and the material with low refractive index to eliminate the influence of antistatic layer on reflectivity may be achieved, the reflection of natural light may be effectively reduced or eliminated in a range of visible light wavelength 380 nm to 780 nm.

The structure of the anti-reflective stack in embodiments of the present disclosure will be described in detail below in combination with FIG. 1 to FIG. 4.

Figure 2:
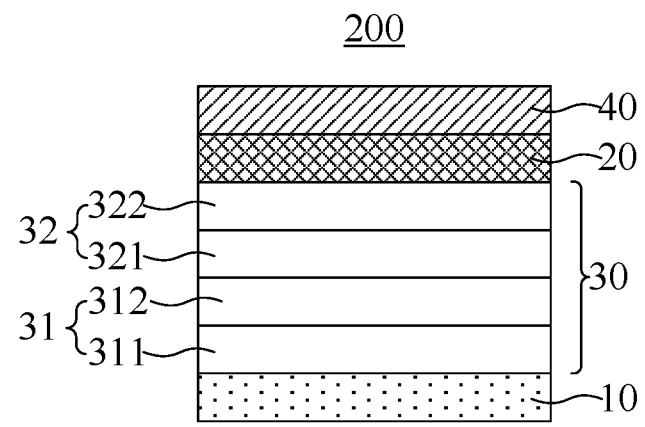
FIG. 2 shows a sectional structure diagram of an anti-reflective stack according to another exemplary embodiment of the present disclosure.
Figure 3:
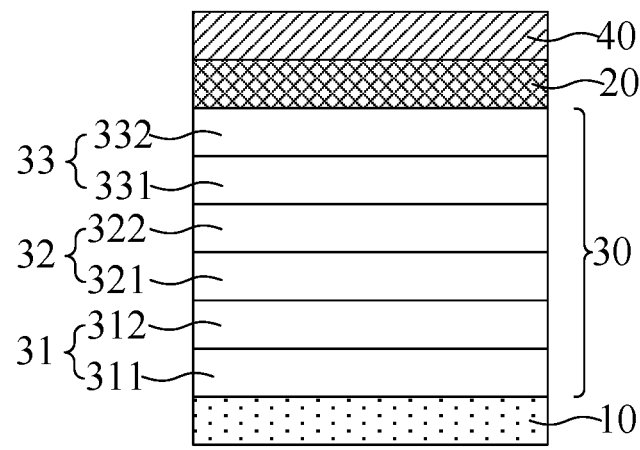
FIG. 3 shows a sectional structure diagram of an anti-reflective stack according to another exemplary embodiment of the present disclosure.

FIG. 1 shows a sectional structure diagram of an anti-reflective stack according to an exemplary embodiment of the present disclosure. FIG. 2 shows a sectional structure diagram of an anti-reflective stack according to another exemplary embodiment of the present disclosure. FIG. 3 shows a sectional structure diagram of an anti-reflective stack according to another exemplary embodiment of the present disclosure.

In embodiments of the present disclosure, as shown in FIG. 1 to FIG. 3, the anti-reflective stack includes a substrate 10, an antistatic layer 20, an anti-reflective layer 30, and a polarizing layer 40. The antistatic layer 20 is arranged on a side of the substrate 10, the anti-reflective layer 30 is arranged between the substrate 10 and the antistatic layer 20, the anti-reflective layer 30 includes at least one composite layer, and each composite layer includes a first anti-reflective layer and a second anti-reflective layer. A refractive index of the first anti-reflective layer is different from a refractive index of the second anti-reflective layer. The composite layer includes the first anti-reflective layer with high refractive index and the second anti-reflective layer with low refractive index. By combining a material with high refractive index and a material with low refractive index, the composite layer may be matched with the antistatic layer 20, so that the anti-reflective layer may eliminate optical interference, thus eliminating the influence of the antistatic layer 20 on the reflectivity and reducing the reflectivity.

In embodiments of the present disclosure, the substrate 10 has a first surface, and the antistatic layer 20 has a second surface. The first surface is opposite to the second surface, that is, the first surface and the second surface are arranged face to face. The anti-reflective layer 30 is attached with the first surface of the substrate 10 and the second surface of the antistatic layer 20, respectively. The anti-reflective layer 30 includes at least one composite layer, where at most one first anti-reflective layer of the composite layer is attached with the first surface of the substrate 10, and at most one second anti-reflective layer of the composite layer is attached with the second surface of the antistatic layer 20.

In embodiments of the present disclosure, the substrate 10 has a first refractive index $n_1$, the antistatic layer 20 has a second refractive index $n_2$, the first anti-reflective layer has a third refractive index $n_3$, and the second anti-reflective layer has a fourth refractive index $n_4$. The second refractive index $n_2$ is greater than the first refractive index mi and the fourth refractive index $n_4$, and the third refractive index $n_3$ is greater than the first refractive index mi and the fourth refractive index $n_4$.

As a large difference exists between the first refractive index $n_1$ of the substrate 10 and the second refractive index $n_2$ of the antistatic layer 20, and the second refractive index $n_2$ of the antistatic layer 20 is greater than the first refractive index mi of the substrate 10, after the natural light passes through the antistatic layer 20 and the substrate 10, the reflectivity of the natural light is increased due to optical interference. Providing the composite layer between the substrate 10 and the antistatic layer 20 may eliminate the optical interference of the natural light after passing through the antistatic layer 20 and the substrate 10, thereby reducing the reflectivity of the natural light.

In an example, by setting the second refractive index $n_2$ to be greater than the first refractive index $n_1$ and the fourth refractive index $n_4$, and the third refractive index $n_3$ to be greater than the first refractive index $n_1$ and the fourth refractive index $n_4$, the refractive indexes between the antistatic layer 20, the second anti-reflective layer, the first anti-reflective layer, and the substrate 10 successively present a form of high refractive index-low refractive index-high refractive index-low refractive index, i.e., a combination of high refractive indexes and low refractive indexes. Therefore, an optical interference phenomenon caused by natural light entering the antistatic layer 20, the composite layer and the substrate 10 may be reduced or eliminated.

In embodiments of the present disclosure, a material of the antistatic layer 20 includes, for example, one or more selected from a transparent metal oxide material, a solution-type conductive polymer material, or a sputter-type inorganic material. The transparent metal oxide material may be, for example, indium tin oxide, the solution-type conductive polymer material may be, for example, Heraeus-polyethylene dioxythiophene (Heraeus-PEDOT), and the sputter-type inorganic material may be, for example, a mixture of graphite oxide, tin oxide, zinc oxide, aluminum oxide, antimony oxide, etc., and surfactant, crosslinking agent. A high resistance film may be formed by the solution-type conductive polymer material or the sputter-type inorganic material, and the impedance of the high resistance film is in a range of 108 to 109 ohms.

In embodiments of the present disclosure, a thickness of the first anti-reflective layer of the composite layer is less than or equal to a thickness of the second anti-reflective layer of the composite layer. The thickness of the first anti-reflective layer refers to a dimension in a direction perpendicular to the first surface of the substrate 10. A material for manufacturing the first anti-reflective layer in the composite layer includes $SiN_x$, and a material for manufacturing the second anti-reflective layer in the composite layer includes $SiO_2$.

In embodiments of the present disclosure, the first refractive index $n_1$ of the substrate 10 is in a range of 1.45 to 1.55, the second refractive index is in a range of 1.50 to 1.90, the third refractive index is in a range of 1.80 to 2.30, and the fourth refractive index is in a range of 1.44 to 1.52.

In embodiments of the present disclosure, the anti-reflective layer includes a plurality of composite layers, and a thickness of one of the plurality of composite layers close to the substrate is less than or equal to a thickness of another one of the plurality of composite layers close to the antistatic layer.

In an example, the number of composite layers may be set to be two or more, and the thicknesses of the composite layers decrease in a direction from close to the antistatic layer towards close to the substrate.

A thickness of the first anti-reflective layer in the composite layer is in a range of 5 nm to 65 nm, and a thickness of the second anti-reflective layer in the composite layer is in a range of 40 nm to 80 nm. The number of composite layers, the thickness of the first anti-reflective layer and the thickness of the second anti-reflective layer may be adjusted according to actual desires. For example, the number of composite layers, the thickness of the first anti-reflective layer, and the thickness of the second anti-reflective layer in the composite layer may be determined according to the first refractive index, the second refractive index, the third refractive index and the fourth refractive index.

In embodiments of the present disclosure, the thickness of the antistatic layer 20 is set to be in a range of 14 nm to 30 nm. The thickness of the antistatic layer 20 may be adjusted according to actual production desires.

Figure 4:
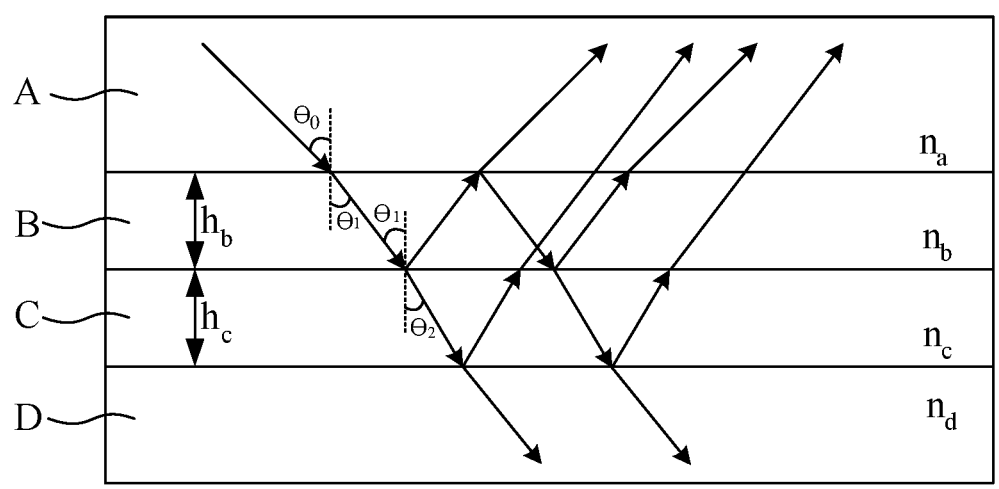
FIG. 4 shows a schematic diagram of refraction of incident light passing through an anti-reflective layer of an anti-reflective stack according to exemplary embodiments of the present disclosure.

FIG. 4 shows a schematic diagram of refraction of incident light passing through an anti-reflective layer of an anti-reflective stack according to exemplary embodiments of the present disclosure. A structural design principle of the anti-reflective stack of embodiments of the present disclosure is described below in detail in combination with FIG. 4.

In the related art, light is known as an electromagnetic wave, and has the characteristics of a wave, and when a train of waves meet with waves with the same frequency, interference will occur. According to the initial phase difference of the two interfering waves, the amplitude of the interfered waves will be different, that is, the superposition of waves or the constructive interference of waves or the destructive interference of waves will occur, resulting in the increase or decrease of the intensity of waves. For thin film interference, there will be a plurality of trains of reflected and transmitted waves during reflection and transmission, but their intensity will gradually weaken, so only the reflected wave reflected once and the transmitted wave reflected twice between the films need to be considered. There will be a certain phase difference between the two trains of waves and the original wave. The phase difference may be adjusted by adjusting the thickness of the film, so as to increase a wave transmission effect or increase a reflection effect.

The following is illustrated in combination with FIG. 4. As shown in FIG. 4, the incident light enters a medium B from a medium A with a refractive index of $n_a$, and undergoes a primary reflection and a primary transmission, the primary reflection light re-enters the medium A and generates a secondary reflection and a secondary transmission. The primary transmission light enters the medium C and generates a reflection. An incident angle of the incident light entering the medium A is $\theta_0$, a refraction angle entering the medium B is $\theta_1$, and a refraction angle entering the medium C is $\theta_2$. The refractive indexes of the medium A, the medium B, the medium C, and the medium D are $n_a$, $n_b$, $n_c$ and $n_a$, respectively.

A reflection coefficient of light passing through the medium B and the medium C may be calculated through following formulas, wherein thicknesses of the medium B and the medium C are known to be $h_b$ and $h_c$ respectively:

For the reflection coefficient of the medium B $$r = \frac{E_{or}}{E_{oi}} = \frac{r_1 + r_2 e^{i\varphi}}{1 + r_1 r_2 e^{i\varphi}}$$

$$\text{wherein, } r_1 = \frac{n_a - n_b}{n_a + n_b}$$

$$r_2 = \frac{n_b - n_c}{n_b + n_c}$$

$$\varphi = \frac{4\pi}{\lambda} n_b h_b \cos\theta_0$$

Thus, the reflectivity of the medium A is:

$$R = \left|\frac{E_{or}}{E_{oi}}\right|^2 = \frac{r_1^2 + r_2^2 + 2r_1 r_2 \cos\varphi}{1 + r_1^2 + r_2^2 + 2r_1 r_2 \cos\varphi}$$

The reflection coefficient of the medium B is:

$$r' = \frac{E'_{or}}{E'_{oi}} = \frac{r'_1 + r'_2 e^{i\varphi'}}{1 + r'_1 r'_2 e^{i\varphi'}}$$

$$r'_1 = \frac{n_b - n_c}{n_b + n_c}$$

$$r'_2 = r_1$$

$$\varphi' = \frac{4\pi}{\lambda} n_c h_c \cos\theta_1$$

Thus, an overall reflectivity of the medium B and the medium C is:

$$R = \left|\frac{E'_{or}}{E'_{oi}}\right|^2 = \frac{r'^2_1 + r'^2_2 + 2r'_1 r'_2 \cos\varphi'}{1 + r'^2_1 + r'^2_2 + 2r'_1 r'_2 \cos\varphi'}$$

That is, by determining the refractive index after interference by multiple media, and designing the thickness of each medium according to the refractive index of that medium, the reflectivity of the anti-reflective stack may be reduced to meet the requirement. For example, in a case that the actual thickness of the medium meets the production requirements, a final total reflectivity of the anti-reflective stack is less than 5.33%, so that the anti-reflective stack still has a good display effect in an outdoor light environment.

In an embodiment of the present disclosure, as shown in FIG. 1, in the embodiment, the anti-reflective layer 30 of the anti-reflective stack 100 includes one composite layer 31. The composite layer 31 includes a first anti-reflective layer 311 and a second anti-reflective layer 312. The first anti-reflective layer 311 is attached with the first surface of the substrate 10 (an upper surface of the substrate 10 shown in FIG. 1), and the second anti-reflective layer 312 is attached with the second surface of the antistatic layer 20 (a lower surface of the antistatic layer 20 shown in FIG. 1).

In the embodiment, in order to meet requirements of refractive index and manufacturing cost, a material for manufacturing the first anti-reflective layer is different from a material for manufacturing the second anti-reflective layer.

In an example, the first anti-reflective layer is made of $SiN_x$ material, and the second anti-reflective layer is made of $SiO_2$ material. The first refractive index $n_1$ of the substrate 10 may be 1.5, the second refractive index $n_2$ of the antistatic layer 20 may be 1.9, the third refractive index $n_3$ of the first anti-reflective layer 311 may be 1.8, and the fourth refractive index $n_4$ of the second anti-reflective layer 312 may be 1.45. The thickness of the first anti-reflective layer 311 may be identical to the thickness of the second anti-reflective layer 312. The thickness of the first anti-reflective layer 311 is set to be in a range of 5 nm to 65 nm. For example, the thickness of the first anti-reflective layer 311 is set to be 50 nm. The thickness of the second anti-reflective layer 312 is set to be in a range of 40 nm to 80 nm. For example, the thickness of the second anti-reflective layer 312 is 50 nm. The thickness of the antistatic layer 20 is set to be in a range of 14 nm to 30 nm. For example, the thickness of the antistatic layer 20 is 16 nm.

The simulation verification of the anti-reflective stack of the embodiment is performed according to the design principle of the anti-reflective stack described above, and a reflectivity $R_{IM}$ of the film layers composed of the composite layer 31 and the antistatic layer 20 of the anti-reflective stack is determined to be 0.76%. A total reflectivity $R_{total}$ of the film layers composed of the composite layer 31, the antistatic layer 20 and the polarizing layer 40 of the anti-reflective stack is 5.07%, so as to achieve a better anti-reflective effect.

In an example, the first refractive index $n_1$ of the substrate 10 is determined to be 1.5, the second refractive index $n_2$ of the antistatic layer 20 is determined to be 1.9, the third refractive index $n_3$ of the first anti-reflective layer 311 may be 1.85, and the fourth refractive index $n_4$ of the second anti-reflective layer 312 may be 1.45. When the thickness of each film layer is the same as the thickness of each film layer in above-mentioned embodiments, a reflectivity $R_{IM}$ of the film layers composed of the composite layer 31 and the antistatic layer 20 of the anti-reflective stack is 1.29%, and a total reflectivity $R_{total}$ of the film layers composed of the composite layer 31, the antistatic layer 20 and the polarizing layer 40 of the anti-reflective stack is 5.26%.

According to the embodiment, if a minimum thickness of the first anti-reflective layer is 50 nm, the third refractive index $n_3$ of the first anti-reflective layer may be 1.8, then a minimum total reflectivity $R_{total}$ is 5.07%, that is, the minimum total reflectivity may be achieved when only one composite layer is provided, so as improve the anti-reflective effect of the anti-reflective stack.

In other embodiments of the present disclosure, the thickness of the first anti-reflective layer and the thickness of the second anti-reflective layer may be adjusted according to actual desires. For example, the minimum thickness of the first anti-reflective layer may be taken as 5 nm, and the minimum thickness of the second anti-reflective layer may be taken as 40 nm.

In another embodiment of the present disclosure, as shown in FIG. 2, in the embodiment, the anti-reflective layer 30 of the anti-reflective stack 200 includes two composite layers. In an example, the anti-reflective layer 30 includes a first composite layer 31 close to the substrate 10 and a second composite layer 32 close to the antistatic layer 20. The first composite layer 31 includes a first anti-reflective layer 311 and a second anti-reflective layer 312, and the second composite layer 32 includes a first anti-reflective layer 321 and a second anti-reflective layer 322. The first anti-reflective layer 311 of the first composite layer 31 is attached with the first surface of the substrate 10, the second anti-reflective layer 322 of the second composite layer 32 is attached with the second surface of the antistatic layer 20, and the second anti-reflective layer 312 of the first composite layer 31 is attached with the first anti-reflective layer 321 of the second composite layer 32.

In the embodiment, the first anti-reflective layer in the first composite layer 31 and the first anti-reflective layer in the second composite layer 32 are made of the same material, and the second anti-reflective layer in the first composite layer 31 and the second anti-reflective layer in the second composite layer 32 are made of the same material. For example, the first anti-reflective layer is made of $SiN_x$ material, and the second anti-reflective layer is made of $SiO_2$ material. The first refractive index $n_1$ of the substrate 10 is determined to be 1.5, the second refractive index $n_2$ of the antistatic layer 20 is determined to be 1.9, the third refractive index $n_3$ of the first anti-reflective layer 311 of the first composite layer 31 and the first anti-reflective layer 321 of the second composite layer 32 is determined to be 1.8, and the fourth refractive index $n_4$ of the second anti-reflective layer 312 of the first composite layer 31 and the second anti-reflective layer 322 of the second composite layer 32 is determined to be 1.45. In an actual production and manufacturing process, as the thickness of $SiN_x$ material is determined according to an actual limit value of the device, for example, in the embodiment, the minimum thickness of $SiN_x$ material formed by the device is 50 nm, in order to meet an actual production demand and reduce a manufacturing cost, the thickness of the first anti-reflective layer 311 of the first composite layer 31 and the thickness of the first anti-reflective layer 321 of the second composite layer 32 are set to be the minimum value, i.e., may be 50 nm. By further adjusting the thickness of the second anti-reflective layer 322 of the second composite layer 32, the reflectivity of the anti-reflective stack may be reduced to a lowest value. In the embodiment, the thickness of the second anti-reflective layer is set to be in a range of 50 to 80 nm. For example, the thickness of the second anti-reflective layer 312 of the first composite layer 31 is set to be 50 nm, and the thickness of the second anti-reflective layer 322 of the second composite layer 32 is set to be 80 nm. For another example, the thickness of the second anti-reflective layer 312 of the first composite layer 31 is set to be 50 nm, and the thickness of the second anti-reflective layer 322 of the second composite layer 32 is set to be 75 nm.

In an embodiment, the simulation verification of the anti-reflective stack of the embodiment is performed according to the design principle of the anti-reflective stack described above. When the anti-reflective stack includes two composite layers, the thickness of the first anti-reflective layer 311 of the first composite layer 31 is 50 nm, the thickness of the second anti-reflective layer 312 of the first composite layer 31 is 50 nm, the thickness of the first anti-reflective layer 321 of the second composite layer 32 is 50 nm, and the thickness of the second anti-reflective layer 322 of the second composite layer 32 is 80 nm, a reflectivity $R_{IM}$ of the film layers composed of the first composite layer 31, the second composite layer 32 and the antistatic layer 20 of the anti-reflective stack is determined to be 0.08%. A total reflectivity $R_{total}$ of the film layers composed of the first composite layer 31, the second composite layer 32, the antistatic layer 20 and the polarizing layer 40 of the anti-reflective stack is 5.15%, so as to achieve a better anti-reflective effect.

In another embodiment, the simulation verification of the anti-reflective stack of the embodiment is performed according to the design principle of the anti-reflective stack described above. When the anti-reflective stack includes two composite layers, the thickness of the first anti-reflective layer 311 of the first composite layer 31 is 50 nm, the thickness of the second anti-reflective layer 312 of the first composite layer 31 is 50 nm, and the thickness of the first anti-reflective layer 321 of the second composite layer 32 is 50 nm, the thickness of the second anti-reflective layer 322 of the second composite layer 32 is 75 nm, a third refractive index $n_3$ of the first anti-reflective layer is 1.85, and a refractive index $n_4$ of the second anti-reflective layer is 1.45, a reflectivity $R_{IM}$ of the film layers composed of the first composite layer 31, the second composite layer 32 and the antistatic layer 20 of the anti-reflective stack is determined to be 0.32%. A total reflectivity $R_{total}$ of the film layers composed of the first composite layer 31, the second composite layer 32, the antistatic layer 20 and the polarizing layer 40 of the anti-reflective stack is 5.23%.

According to the embodiment, when the anti-reflective stack includes two composite layers, the minimum thickness of the first anti-reflective layer is 50 nm, and the third refractive index $n_3$ of the first anti-reflective layer is determined to be 1.8, the anti-reflective stack has the minimum total reflectivity $R_{total}$ of 5.07%, that is, when the anti-reflective stack has two composite layers, and the third refractive index $n_3$ of the first anti-reflective layer is 1.8, the minimum total reflectivity may be achieved, so as to improve the anti-reflective effect of the anti-reflective stack.

According to embodiments of the present disclosure, by arranging the composite layers into a stack with different refractive indexes, and setting the thickness of one of the composite layers close to the substrate to be less than or equal to the thickness of another one of the composite layers close to the antistatic layer, the reflectivity of the environment light incident on the anti-reflective layer may be reduced, so that the display device with the anti-reflective stack has a better display effect.

In another embodiment of the present disclosure, as shown in FIG. 3, in the embodiment, the anti-reflective layer 30 of the anti-reflective stack 300 includes three composite layers. In an example, the anti-reflective layer 30 includes a first composite layer 31 close to the substrate 10, a third composite layer 33 close to the antistatic layer 20, and a second composite layer 32 between the first composite layer 31 and the third composite layer 33. The first composite layer 31 includes a first anti-reflective layer 311 and a second anti-reflective layer 312, the second composite layer 32 includes a first anti-reflective layer 321 and a second anti-reflective layer 322, and the third composite layer 33 includes a first anti-reflective layer 331 and a second anti-reflective layer 332. The first anti-reflective layer 311 of the first composite layer 31 is attached with the first surface of the substrate 10, and the second anti-reflective layer 332 of the third composite layer 33 is attached with the second surface of the antistatic layer 20.

In the embodiment, the thickness of the first anti-reflective layer and the thickness of the second anti-reflective layer in each of the three composite layers are set to be the same dimension. For example, the thicknesses are set to be 50 nm. The third refractive index $n_3$ of the first anti-reflective layer is 1.8. The simulation verification of the anti-reflective stack of the embodiment is performed according to the design principle of the anti-reflective stack described above. When the anti-reflective stack includes three composite layers, a reflectivity $R_{IM}$ of the film layers composed of the first composite layer 31, the second composite layer 32, the third composite layer 33 and the antistatic layer 20 of the anti-reflective stack is determined to be 0.24%. A total reflectivity $R_{total}$ of the film layers composed of the first composite layer 31, the second composite layer 32, the third composite layer 33, the antistatic layer 20 and the polarizing layer 40 of the anti-reflective stack is 5.20%.

In another exemplary embodiment, the anti-reflective stack includes three composite layers that have identical thicknesses, for example, the thicknesses are all 50 nm, and the third refractive index of the first anti-reflective layer is determined to be 1.85, the simulation verification of the anti-reflective stack of the embodiment is performed according to the design principle of the anti-reflective stack described above. A reflectivity $R_{IM}$ of the film layers composed of the first composite layer 31, the second composite layer 32, the third composite layer 33 and the antistatic layer 20 of the anti-reflective stack is determined to be 0.37%. A total reflectivity $R_{total}$ of the film layers composed of the first composite layer 31, the second composite layer 32, the antistatic layer 20 and the polarizing layer 40 of the anti-reflective stack is 5.24%.

According to the embodiment, when the anti-reflective stack includes three composite layers, and the minimum thickness of the first anti-reflective layer is 50 nm, and the third refractive index $n_3$ of the first anti-reflective layer is determined to be 1.8, the anti-reflective stack has a minimum total reflectivity $R_{total}$ of 5.07%. That is, when the anti-reflective stack has three composite layers, and the third refractive index $n_3$ of the first anti-reflective layer is 1.8, the minimum total reflectivity may be achieved, so as to improve the anti-reflective effect of the anti-reflective stack.

In exemplary embodiments of the present disclosure, the anti-reflective layer includes the first composite layer close to the substrate, the third composite layer close to the antistatic layer, and the second composite layer between the first composite layer and the third composite layer. The thickness of the first composite layer is less than or equal to the thickness of the second composite layer, and the thickness of the second composite layer is less than or equal to the thickness of the third composite layer.

According to embodiments of the present disclosure, through the stack in which the thicknesses from the composite layer close to the antistatic layer to the composite layer close to the substrate gradually decrease, the reflectivity of the incident light after entering the anti-reflective layer may be reduced, so as to achieve a good anti-reflective effect of the anti-reflective stack.

In exemplary embodiments of the present disclosure, as shown in FIG. 1 to FIG. 3, the anti-reflective stack of embodiments of the present disclosure further includes a polarizing layer 40 on a side of the antistatic layer 20 away from the substrate 10. The polarizing layer 40 has a fifth refractive index $n_5$, and the fifth refractive index $n_5$ is less than the second refractive index $n_2$ of the antistatic layer 20, so that the film layer structure in the anti-reflective stack presents a combination of high refractive index and low refractive index, so as to reduce or eliminate the effect of reflection and achieve the minimum reflectivity.

For example, the fifth refractive index $n_5$ is in a range of 1.45 to 1.55, such as 1.52.

In embodiments of the present disclosure, the first anti-reflective layer is made of $SiN_x$ material, and under different manufacturing processes, the first anti-reflective layer has different refractive indexes. For example, the refractive index of the first anti-reflective layer containing $SiN_x$ manufactured under a low-temperature film formation process is 1.8, and the refractive index of the first anti-reflective layer containing $SiN_x$ manufactured under a high-temperature film formation process is 1.85.

According to the above, in a process of manufacturing the first anti-reflective layer, when the minimum thickness is 50 nm, the best effect of eliminating reflection may be achieved by determining the refractive index of the first anti-reflective layer to be 1.8, while using the low-temperature film formation process, so as to effectively reduce a manufacturing cost.

Figure 5:
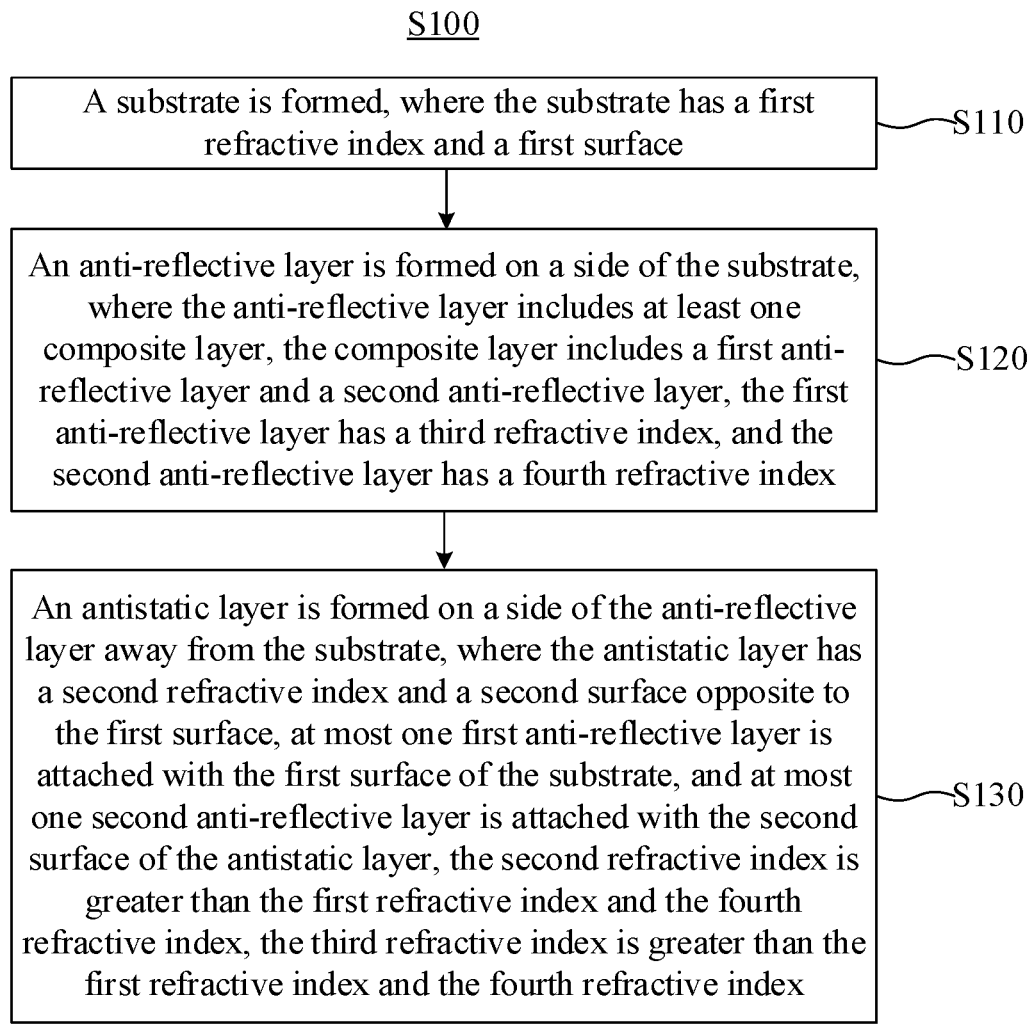
FIG. 5 shows a flowchart of a method of manufacturing an anti-reflective stack according to exemplary embodiments of the present disclosure.

FIG. 5 shows a flowchart of a method of manufacturing an anti-reflective stack according to exemplary embodiments of the present disclosure.

The method of manufacturing an anti-reflective stack of embodiments of the present disclosure will be described in detail below in combination with FIG. 5.

As shown in FIG. 5, a process S100 of the method of manufacturing an anti-reflective stack includes operation S110 to operation S130.

In operation S110, a substrate is formed, where the substrate has a first refractive index and a first surface.

In an example, the substrate may be, for example, a color filter glass substrate. The substrate has a refractive index that varies according to a manufacturing process and a manufacturing material. The refractive index of the substrate in the embodiment is in a range of 1.45 to 1.55. For example, the refractive index is 1.50.

In operation S120, an anti-reflective layer is formed on a side of the substrate, the anti-reflective layer includes at least one composite layer, the composite layer includes a first anti-reflective layer and a second anti-reflective layer, the first anti-reflective layer has a third refractive index, and the second anti-reflective layer has a fourth refractive index.

In an example, when forming the composite layer of the anti-reflective layer, by adopting different forming processes and forming materials, the first anti-reflective layer of the composite layer may have a refractive index different from that of the second anti-reflective layer of the composite layer, thus achieving different antireflective effects.

For example, the $SiN_x$ material is used to form the first anti-reflective layer, the first anti-reflective layer with a refractive index of 1.8 may be obtained by using the low-temperature film formation process, and the first anti-reflective layer with a refractive index of 1.85 may be obtained by using the high-temperature film formation process.

For example, the $SiO_2$ material is used to form the second anti-reflective layer.

In embodiments of the present disclosure, a number of composite layers, such as one composite layer, two composite layers, three composite layers, or other number of composite layers, may be formed by different processes. The number of composite layers may be adjusted according to the actual requirements of the anti-reflective performance.

In operation S130, an antistatic layer is formed on a side of the anti-reflective layer away from the substrate. The antistatic layer has a second refractive index and a second surface opposite to the first surface. At most one first anti-reflective layer is attached with the first surface of the substrate. At most one second anti-reflective layer is attached with the second surface of the antistatic layer. The second refractive index is greater than the first refractive index and the fourth refractive index. The third refractive index is greater than the first refractive index and the fourth refractive index.

In an example, after the formation of the anti-reflective layer, the antistatic layer is formed on a side of the anti-reflective layer away from the substrate. As the refractive index of the antistatic layer is greater than the refractive index of the substrate, the anti-reflective layer including a composite layer is arranged between the substrate and the antistatic layer to combine the material with high refractive index and the material with low refractive index to reduce or eliminate the reflection of natural light, thereby reducing the reflectivity.

In embodiments of the present disclosure, the method of manufacturing an anti-reflective layer further includes forming a polarizing layer on a side of the antistatic layer away from the substrate.

According to embodiments of the present disclosure, the anti-reflective stack manufactured by the method of manufacturing an anti-reflective stack of embodiments of the present disclosure has a first anti-reflective layer and a second anti-reflective layer of a stack, and the second refractive index of the antistatic layer is greater than the third refractive index, and greater than the first refractive index of the substrate and the fourth refractive index of the second anti-reflective layer, and the third refractive index of the first anti-reflective layer is greater than the first refractive index of the substrate and the fourth refractive index of the second anti-reflective layer, the purpose of combining the material with high refractive index and the material with low refractive index to eliminate the influence of the antistatic layer on reflectivity may be achieved, the reflection of natural light may be effectively reduced or eliminated in a range of visible light wavelength 380 nm to 780 nm.

Figure 6:
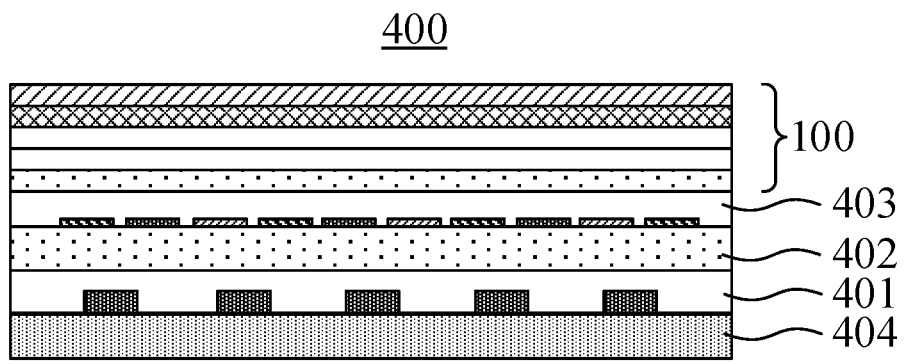
FIG. 6 shows a sectional diagram of a display panel according to exemplary embodiments of the present disclosure.

FIG. 6 shows a sectional diagram of a display panel according to exemplary embodiments of the present disclosure.

As shown in FIG. 6, in some embodiments of the present disclosure, a display panel 400 is further provided. The display panel includes an array substrate 401, a color film substrate 403, a liquid crystal layer 402, and an anti-reflective stack 100. The color film substrate 403 is arranged opposite to the array substrate 401. The liquid crystal layer 402 is arranged between the array substrate 401 and the color film substrate 403. The anti-reflective stack 100 is arranged on a side of the color film substrate 403 away from the array substrate 401.

In the embodiment, the display panel 400 includes a rear polarizer 404 on a side of the array substrate 401 away from the anti-reflective stack 100. The liquid crystal layer 402 may include, for example, a liquid crystal material layer (LC layer) and a covering layer (OC) covering the liquid crystal material layer.

In embodiments of the present disclosure, the anti-reflective stack 100 is the anti-reflective stack described above. The color film substrate 403 includes a base substrate, and the substrate of the anti-reflective stack includes the base substrate of the color film substrate. According to embodiments of the present disclosure, the anti-reflective stack is arranged on the color film substrate 403 to achieve the anti-reflective effect.

Figure 7:
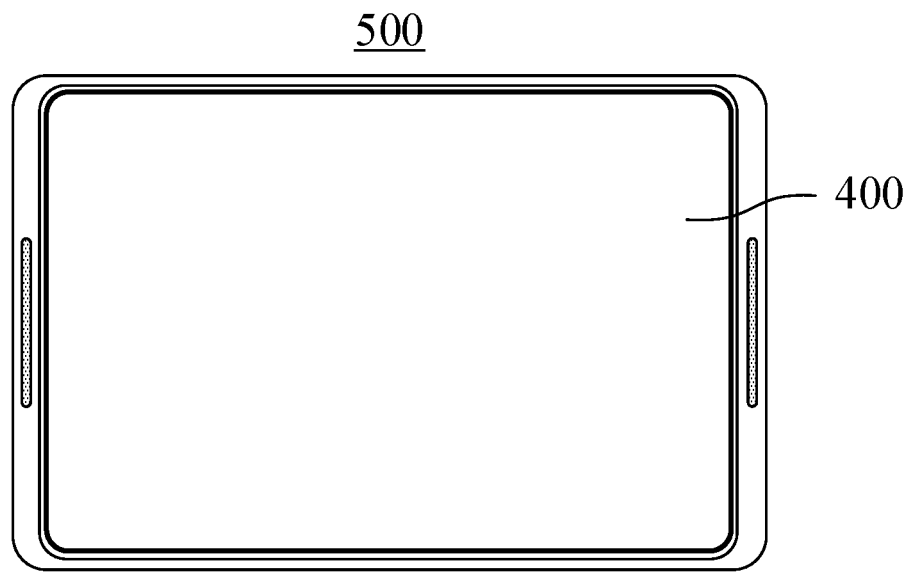
FIG. 7 shows a schematic diagram of a display device according to exemplary embodiments of the present disclosure.

FIG. 7 shows a schematic diagram of a display device according to exemplary embodiments of the present disclosure.

As shown in FIG. 7, the display device 500 includes a display panel 400 described above.

The beneficial effects achieved by the display device 500 in the above-mentioned embodiments of the present disclosure are the same as the beneficial effects achieved by the above-mentioned display panel 400 and anti-reflective stack, which will not be repeated here.

The above-mentioned display device 500 may be any device that displays either images or texts, whether in motion (e.g., video) or stationary (e.g., still images). More specifically, it is expected that the embodiments may be implemented in or associated with a variety of electronic devices, such as (but not limited to) a vehicle mounted display, a mobile phone, a wireless device, a personal data assistant (PDA), a handheld or portable computer, a GPS receiver/navigator, a camera, a MP4 video player, a video camera, a game console, a watch, a clock, a calculator, a TV monitor, a flat panel display, a computer monitor, an automobile display (e.g., an odometer display, etc.), a navigator, a cockpit controller and/or display, a display of camera view (e.g., a display of rear-view camera in a vehicle), an electronic photo, an electronic billboard or indicator, a projector, an architectural structure, a packaging and aesthetic structure (e.g., a display of image of a piece of jewelry), etc.

Some embodiments of the general concept of the present disclosure have been illustrated and described. However, those skilled in the art will understand that these embodiments may be changed without departing from the principle and spirit of the general concept of the present disclosure. The scope of the present disclosure is limited by the claims and their equivalents.

What is claimed is:

1. An anti-reflective stack, comprising:
a substrate having a first refractive index and a first surface;
an antistatic layer on a side of the substrate, wherein the antistatic layer has a second refractive index and a second surface opposite to the first surface; and
an anti-reflective layer between the substrate and the antistatic layer, wherein the anti-reflective layer comprises one or more composite layers stacked in sequence in a direction away from the substrate, each of the one or more composite layers comprises a first anti-reflective layer and a second anti-reflective layer stacked in sequence in the direction away from the substrate, the first anti-reflective layer has a third refractive index, and the second anti-reflective layer has a fourth refractive index, wherein one first anti-reflective layer in the anti-reflective layer is attached with the first surface of the substrate, and one second anti-reflective layer in the anti-reflective layer is attached with the second surface of the antistatic layer, wherein the second refractive index is greater than the first refractive index and the fourth refractive index, and the third refractive index is greater than the first refractive index and the fourth refractive index, wherein a thickness of the first anti-reflective layer is less than or equal to a thickness of the second anti-reflective layer, and wherein the one or more composite layers is a plurality of composite layers, and a thickness of one of the plurality of composite layers close to the substrate is less than or equal to a thickness of another one of the plurality of composite layers close to the antistatic layer.

2. The anti-reflective stack according to claim 1, wherein the anti-reflective layer comprises a first composite layer close to the substrate and a second composite layer close to the antistatic layer, and wherein the first anti-reflective layer of the first composite layer is attached with the first surface of the substrate, and the second anti-reflective layer of the second composite layer is attached with the second surface.

3. The anti-reflective stack according to claim 1, wherein the anti-reflective layer comprises a first composite layer close to the substrate, a third composite layer close to the antistatic layer, and a second composite layer between the first composite layer and the third composite layer, and wherein a thickness of the first composite layer is less than or equal to a thickness of the second composite layer, and the thickness of the second composite layer is less than or equal to a thickness of the third composite layer.

4. The anti-reflective stack according to claim 1, wherein the first refractive index is in a range of 1.45 to 1.55; the second refractive index is in a range of 1.50 to 1.90; the third refractive index is in a range of 1.80 to 2.30; and the fourth refractive index is in a range of 1.44 to 1.52.

5. The anti-reflective stack according to claim 1, wherein a material for manufacturing the first anti-reflective layer is different from a material for manufacturing the second anti-reflective layer.

6. The anti-reflective stack according to claim 5, wherein the material for manufacturing the first anti-reflective layer comprises $SiN_x$; and the material for manufacturing the second anti-reflective layer comprises $SiO_2$.

7. The anti-reflective stack according to claim 1, further comprising a polarizing layer on a side of the antistatic layer away from the substrate.

8. The anti-reflective stack according to claim 7, wherein the polarizing layer has a fifth refractive index, and the fifth refractive index is less than the second refractive index.

9. The anti-reflective stack according to claim 8, wherein the fifth refractive index is in a range of 1.45 to 1.55.

10. The anti-reflective stack according to claim 1, wherein a thickness of the first anti-reflective layer is in a range of 5 nm to 65 nm; and a thickness of the second anti-reflective layer is in a range of 40 nm to 80 nm.

11. The anti-reflective stack according to claim 1, wherein a thickness of the antistatic layer is in a range of 14 nm to 30 nm.

12. The anti-reflective stack according to claim 1, wherein the transparent metal oxide material comprises indium tin oxide;

the solution-type conductive polymer material comprises Heraeus-polyethylene dioxythiophene; and the sputter-type inorganic material comprises a mixture of graphite oxide, tin oxide, zinc oxide, aluminum oxide, antimony oxide, and surfactant, crosslinking agent.

13. The anti-reflective stack according to claim 1, wherein the substrate comprises a color filter.

14. A display panel, comprising:
an array substrate;
a color film substrate, wherein the color film substrate is arranged opposite to the array substrate;
a liquid crystal layer between the array substrate and the color film substrate; and
an anti-reflective stack on a side of the color film substrate away from the array substrate,
wherein the anti-reflective stack is the anti-reflective stack according to claim 1.

15. The display panel according to claim 14, wherein the color film substrate comprises a base substrate, and the substrate of the anti-reflective stack comprises the base substrate of the color film substrate.

16. A display device, comprising the display panel according to claim 14.

17. The anti-reflective stack according to claim 1, wherein a material for manufacturing the antistatic layer comprises at least one selected from a transparent metal oxide material, a solution-type conductive polymer material, or a sputter-type inorganic material.

18. A method of manufacturing an anti-reflective stack, comprising:
forming a substrate having a first refractive index and a first surface;
forming an anti-reflective layer on a side of the substrate, wherein the anti-reflective layer comprises one or more composite layers stacked in sequence in a direction away from the substrate, each of the one or more composite layers comprises a first anti-reflective layer and a second anti-reflective layer stacked in sequence in the direction away from the substrate, the first anti-reflective layer has a third refractive index, and the second anti-reflective layer has a fourth refractive index; and
forming an antistatic layer on a side of the anti-reflective layer away from the substrate, wherein the antistatic layer has a second refractive index and a second surface opposite to the first surface,
wherein one first anti-reflective layer in the anti-reflective layer is attached with the first surface of the substrate, and one second anti-reflective layer in the anti-reflective layer is attached with the second surface of the antistatic layer,
wherein the second refractive index is greater than the first refractive index and the fourth refractive index, and the third refractive index is greater than the first refractive index and the fourth refractive index,
wherein a thickness of the first anti-reflective layer is less than or equal to a thickness of the second anti-reflective layer, and
wherein the one or more composite layers is a plurality of composite layers, and a thickness of one of the plurality of composite layers close to the substrate is less than or equal to a thickness of another one of the plurality of composite layers close to the antistatic layer.

* * * * *